(12) United States Patent
Lai et al.

(10) Patent No.: US 6,516,371 B1
(45) Date of Patent: Feb. 4, 2003

(54) NETWORK INTERFACE DEVICE FOR ACCESSING DATA STORED IN BUFFER MEMORY LOCATIONS DEFINED BY PROGRAMMABLE READ POINTER INFORMATION

(75) Inventors: Po-Shen Lai, San Jose, CA (US); Autumn J. Niu, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/320,580

(22) Filed: May 27, 1999

(51) Int. Cl.⁷ .............................................. G06F 13/14
(52) U.S. Cl. .............................. 710/129; 710/4; 710/33
(58) Field of Search ............................ 710/3, 4, 22, 33, 710/129, 131; 370/230, 389, 392

(56) References Cited

U.S. PATENT DOCUMENTS

| | | | | |
|---|---|---|---|---|
| 4,953,157 A | * | 8/1990 | Franklin et al. | 370/230 |
| 4,991,169 A | * | 2/1991 | Davis et al. | 370/463 |
| 5,163,138 A | * | 11/1992 | Thirumalai | 710/131 |
| 5,524,007 A | * | 6/1996 | White et al. | 370/419 |
| 5,657,466 A | * | 8/1997 | Yazawa | 711/159 |
| 5,790,804 A | * | 8/1998 | Osborne | 709/245 |
| 5,903,775 A | * | 5/1999 | Murray | 710/33 |
| 5,953,330 A | * | 9/1999 | Canniff et al. | 370/352 |
| 5,991,299 A | * | 11/1999 | Radogna et al. | 370/392 |
| 6,084,733 A | * | 7/2000 | Ohzeki et al. | 360/53 |
| 6,085,328 A | * | 7/2000 | Klein et al. | 709/227 |
| 6,145,016 A | * | 11/2000 | Lai et al. | 710/4 |
| 6,150,679 A | * | 11/2000 | Reynolds | 257/213 |
| 6,226,338 B1 | * | 5/2001 | Earnest | 375/372 |
| 6,246,683 B1 | * | 6/2001 | Connery et al. | 370/392 |

* cited by examiner

Primary Examiner—Thomas Lee
Assistant Examiner—Thuan Du (57) ABSTRACT

A network interface device includes a random access memory used as a transmit and receive buffer for transmission and reception of data between a host computer bus and a packet switched network. The network interface device includes a read controller and read offset register that stores read pointer information. The host CPU programs the read offset register to any particular value so that the read controller will read data from a desired starting point. In this manner, the host CPU is able to skip parts of a frame stored in the random access memory.

10 Claims, 6 Drawing Sheets

| STATUS Upper | RX_VALID | RX_START_PROC | RX_TRUNC | RX_FRAM_ERR | RX_CRC_ERR | RX_OFLO_ERR | RX_PERF | RX_BCAST | RX_MCAST | RX_UCAST | RX_HASH_MATCH | RX_TABLE_MATCH | RX_MAC1_MATCH | RX_MAC0_MATCH | RX_FRM_ABORT |
|---|---|---|---|---|---|---|---|---|---|---|---|---|---|---|---|
| STATUS Lower | RX_FRM_LENG | | | | | | | | | | | | | | |

NETWORK INTERFACE DEVICE FOR ACCESSING DATA STORED IN BUFFER MEMORY LOCATIONS DEFINED BY PROGRAMMABLE READ POINTER INFORMATION

BACKGROUND OF THE INVENTION

1. Technical Field

The present invention relates to network interfacing and more particularly, to methods and systems for accessing data transmitted over a network and stored in a buffer memory.

2. Background Art

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO prior to transmission on the network media by a Media Access Controller (MAC), and receive data is stored in a receive FIFO by the MAC prior to transfer to the host computer via a host computer bus interface.

One disadvantage with the use of a FIFO for a transmit buffer or a receive buffer of a network interface device is the high latency encountered during the buffering process. The latency of the network interface device is the time delay between the time that a data frame is supplied to the network interface device and the time the data is transmitted on the network media, or vice versa.

An additional disadvantage with the use of a FIFO for a transmit or receive buffer is the lack of flexibility in manipulating data. For example, a data frame received in a receive FIFO must be read out in the order received, by definition. In computer networks where a plurality of network stations are transmitting data, a user may receive a large amount of data in a short amount of time. Accordingly, a receive FIFO that reads each bit of each data frame in the order received further increases the latency in processing the actual incoming data.

DISCLOSURE OF THE INVENTION

There is a need for an arrangement that enables the use of a random access memory in a network interface device, as opposed to a FIFO buffer, to store a data frame and to provide flexibility in reading the data frame.

There is also a need for a method of reading data stored in a random access memory of a network interface device in a flexible and efficient manner.

These and other needs are met by the present invention, where a network interface device includes a random access memory for storing data frames, a read controller for accessing the data and a programmable register for storing read pointer information.

According to one aspect of the invention, a network interface device is provided for buffering data. The network interface device includes a random access memory and a read offset register configured to store read pointer information. The network interface device also includes a read controller configured to read data stored in the random access memory based on the read pointer information.

Another aspect of the present invention provides a method for reading data stored in a network interface device. The method includes receiving data frames and storing the data frames into a random access memory. The method also includes reading the contents of a read offset register. The method further includes reading data stored in the random access memory based on the contents of the read offset register.

Additional advantages and features of the present invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout.

BEST MODE FOR CARRYING OUT THE INVENTION

The present invention will be described with the example of a network interface device in a packet switched network, such as an Ethernet (IEEE 802.3) network. A description will first be given of a network interface device architecture, followed by the arrangement for accessing flame locations in a buffer memory. It will become apparent, however, that the present invention is also applicable to other network interface device systems.

NETWORK INTERFACE DEVICE ARCHITECTURE

Figure 1:
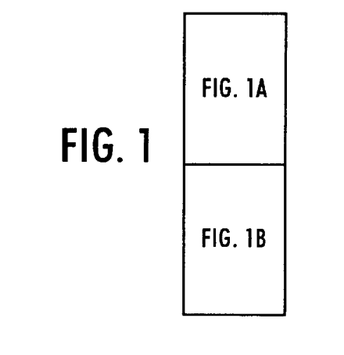
FIG. 1 is a block diagram illustrating an exemplary network interface device having a memory controller for writing a data frame into a random access memory according to an embodiment of the present invention.
Figure 1A:
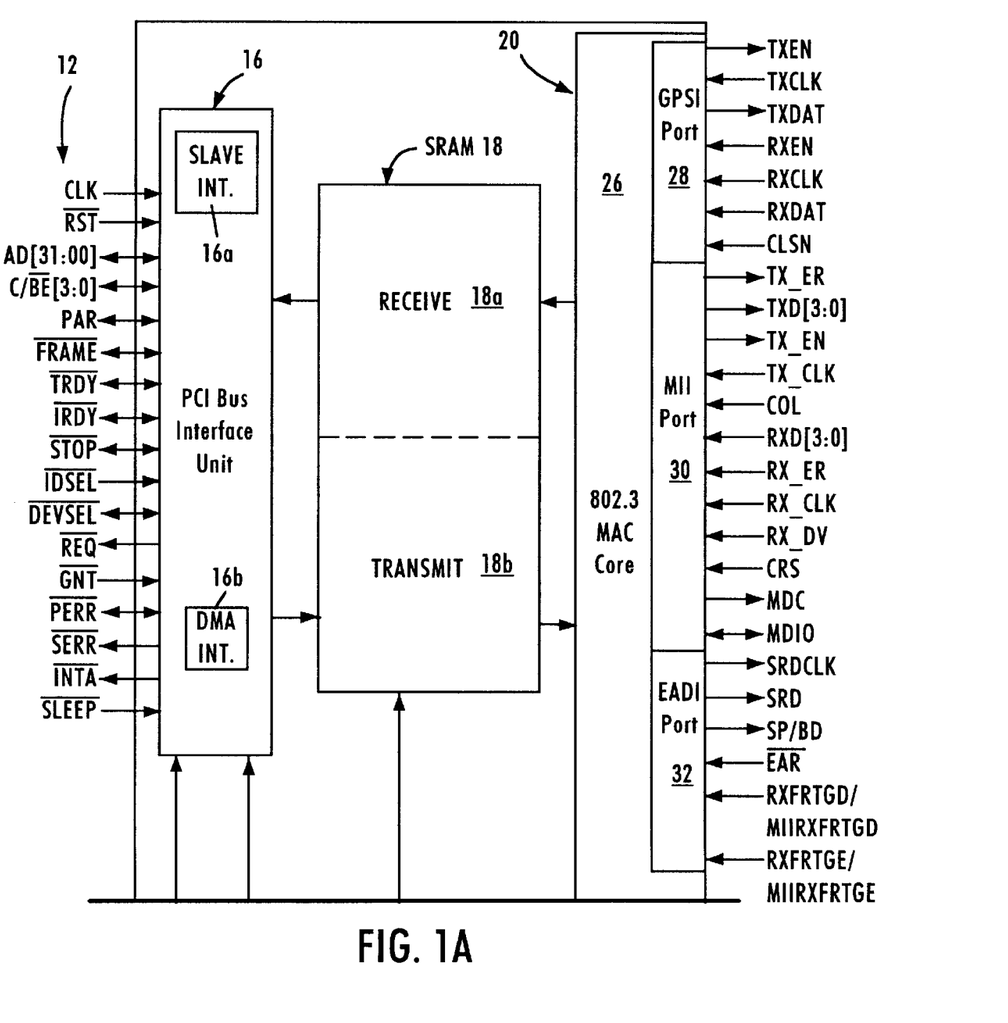
Figure 1B:
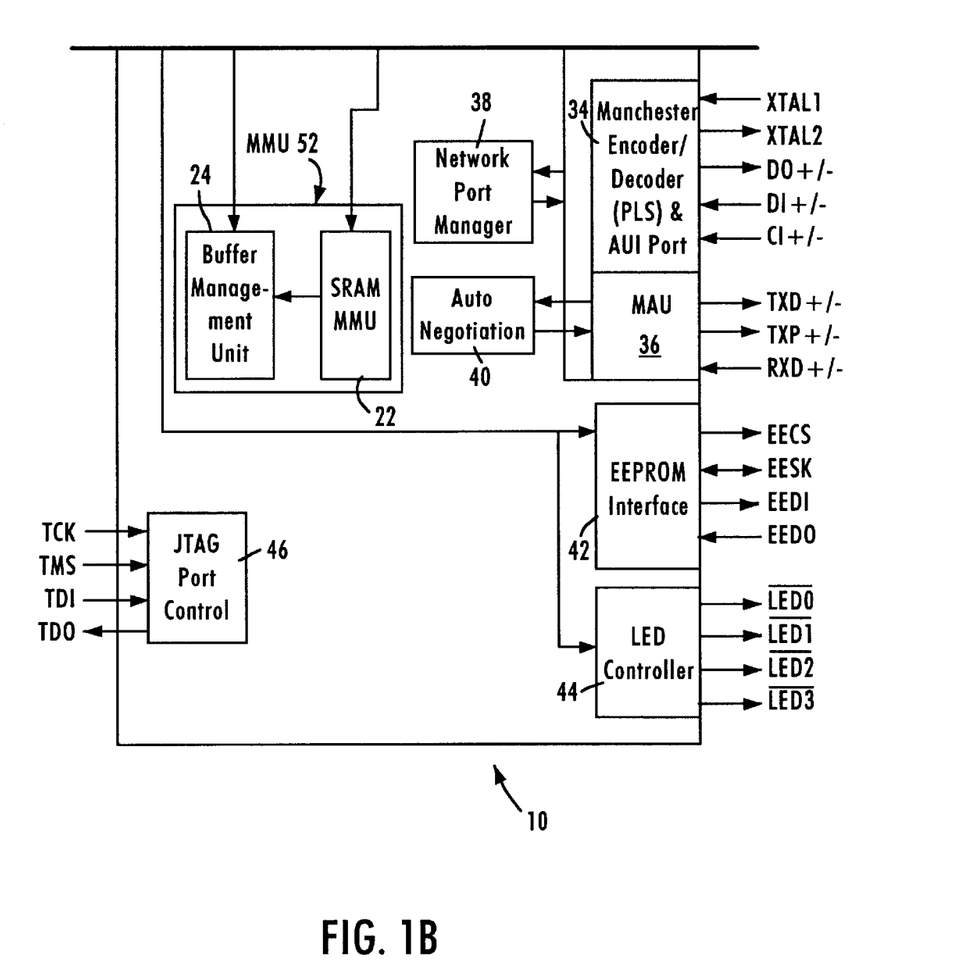

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface device portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU (not shown). The DMA interface 16b manages DMA transfers by the network interface device 10 to and from host memory 17, shown in FIG. 2. Hence, the PCI bus interface unit 16 can be selectively configured for PCI transfers in slave and/or master (e.g., DMA) mode.

The memory unit 18 includes a 32-bit SRAM implemented directly on the network interface device chip 10. According to the disclosed embodiment, the SRAM 18 may be accessed in a random access manner under the control of an SRAM memory management unit (MMU) 22, or may be a segmented system with a receive portion 18a and a transmit portion 18b for receive and transmit paths, respectively.

The network interface device 10 also includes a buffer management unit 24 configured for managing DMA transfers based on DMA descriptors in host memory 17 that specify start address, length, etc. The buffer management unit 24 initiates a DMA read from host memory 17 into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory unit 18. Although the buffer management unit 24 and the SRAM MMU 22 are shown as discrete components, the two units, 22 and 24, may be integrated to form a memory management unit controlling all transfers of data to and from the memory unit 18.

The network interface device 10 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface device 10 also includes a network port manager 38 configured for performing MII handshaking between two devices on an MII bus via the MII port 30. Such MII handshaking may include link information programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full duplex.

The LED controller 44 selectively controls the generation of LED output signals based upon the internal decoding logic and network interface device status registers (not shown). The network interface device 10 also includes an IEEE 1149.1-compliant JTAG boundary scan test access port interface 46.

The EEPROM interface 42 connects to an EEPROM on either a network interface device adapter card or the motherboard of the host computer via a serial interface link. The EEPROM (not shown in FIG. 1) will be programmed with configuration information related to the network interface device, enabling the network interface device to be configured during initialization via the EEPROM interface 42. Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specified protocol, described below.

MEMORY MANAGEMENT ARCHITECTURE

Figure 2:
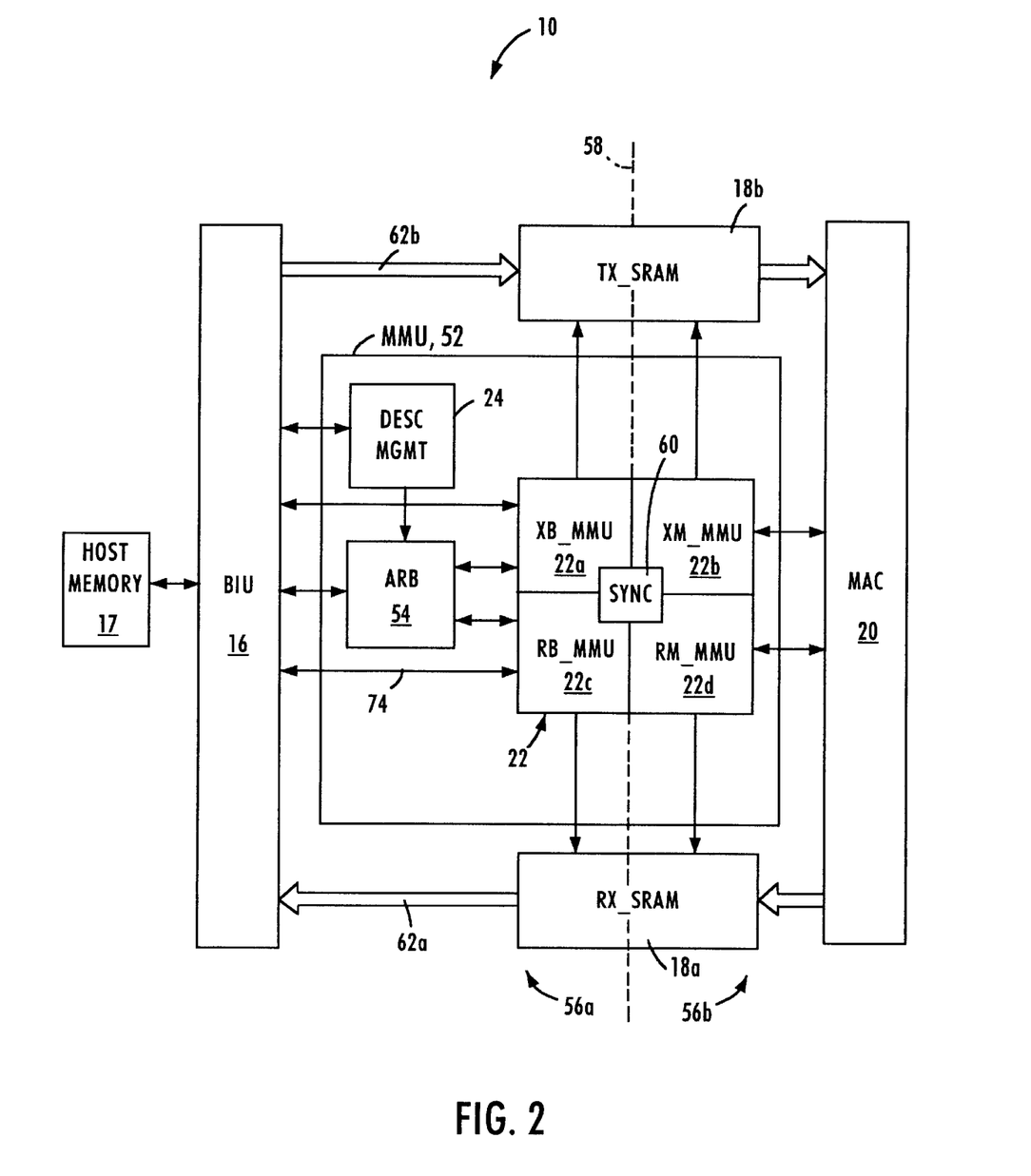
FIG. 2 is a block diagram illustrating the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1. The MMU 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_SRAM) 18b may be implemented as a single memory device, or alternatively as two separate SRAM devices.

As shown in FIG. 2, the memory management unit 52 includes the buffer management unit 24, also referred to as the descriptor management unit, the SRAM MMU 22, and an arbitration unit 54. The arbitration unit 54 arbitrates DMA requests for data transmission, data reception, descriptor lists from the descriptor management block 24, and status.

The SRAM MMU 22 includes separate controllers for each SRAM 18a and 18b, for both read and write operations. According to the disclosed embodiment, the network interface device 10 operates in two generic clock domains, namely a host computer bus clock domain 56a, and a network clock domain 56b. Since the network interface device 10 needs to send and receive data across two independent clock domains 56, schematically indicated as divided by the dotted line 58, the SRAM MMU 22 needs to be able to write and read data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit (XB_MMU) 22a, a transmit-data MAC-side memory management unit (XM_MMU) 22b, a receive-data bus-side memory management unit (RB_MMU) 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20.

The XM_MMU 22b and the RB_MMU 22c operate as read controllers configured for reading frame data from the SRAMs 18b and 18a, respectively. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal (CLK).

Similarly, transmit data to be output onto the network by the MAC 20 is written into the TX_SRAM 18b via data path 62b under the control of the transmit-data write controller 22a, configured for writing the frame data synchronized to the PCI bus clock (CLK). The stored transit data is read and output from the TX_SRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and TX_SRAM 18b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

Figure 3A:
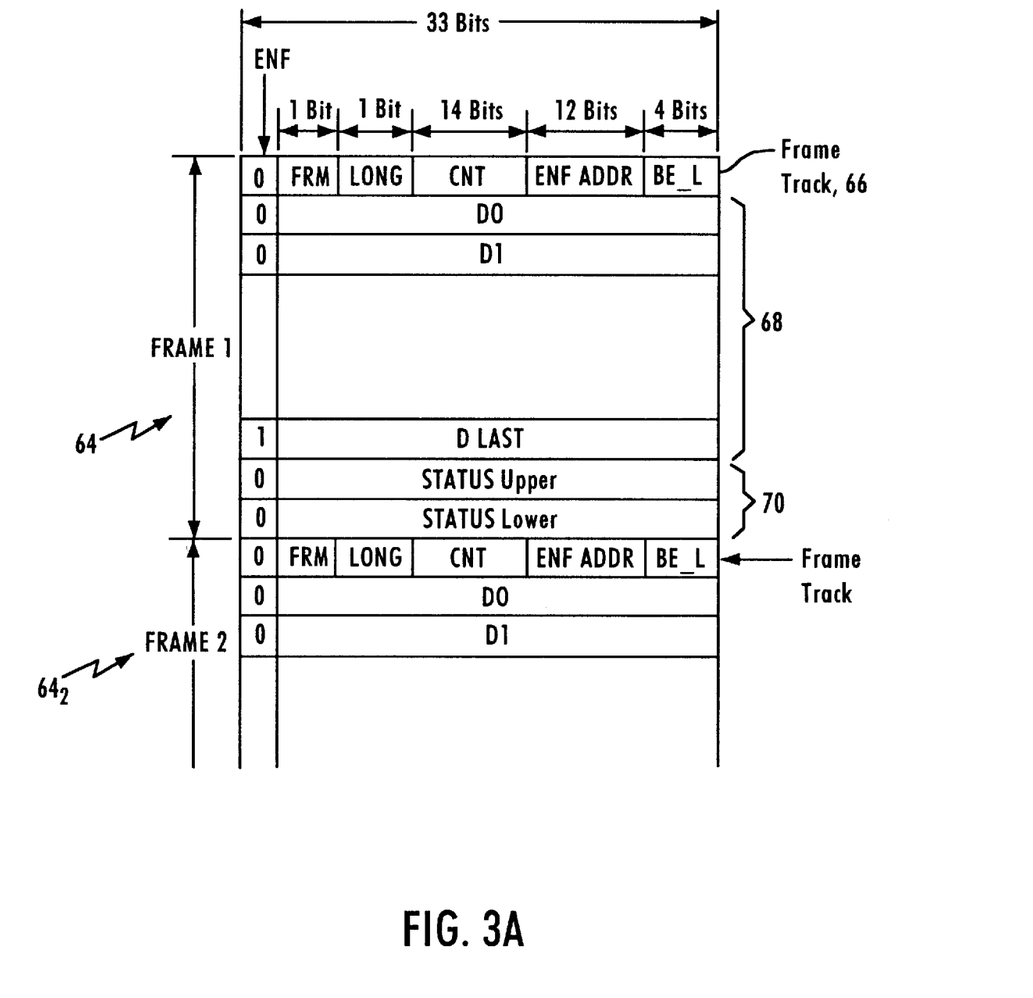
FIGS. 3A and 3B illustrate an exemplary data structure of a data frame stored in the random access memory of FIG. 1.

FIG. 3A is a diagram illustrating a data structure of a receive data unit in RX_SRAM 18a. A similar structure also may be used for storing data in the TX_SRAM 18b. As shown in FIG. 3A, each stored frame 64 includes a frame track field 66 preceding a group of data bytes representing the data frame 68 (i.e., the packet data received from MAC 20), followed by a status information field 70. In this case, the RM_MMU 22d stores frame track field 66 and the control field 70 related to the receive data frame 68. The frame track field 66 is used by the RB_MMU 22c to keep track of the location of the corresponding receive data frame 68 in the RX_SRAM 18a. Hence, the frame track field 66 enables the RB_MMU 22c to quickly flush a stored frame 64 having receive data 68 and jump to the beginning of the next stored frame (e.g., $64_2$), based on an end of frame address field (ENF ADDR), a count (CNT) field specifying the total number of bytes in the receive frame and an end of frame (ENF) bit indicating whether the data frame 64 contains valid data ready for reading.

The frame track field 66 also includes a frame (FRM) field, which indicates that the entire receive data frame 68 is stored in the RX_SRAM 18a and a byte enable-last field (BE_L) which specifies how many of the bytes in a DLAST field are valid. The frame track field 66 further contains a long frame (LONG) field which indicates that the expected receive frame length is greater than a predetermined length.

Referring to FIG. 3A, in the exemplary embodiment of the invention, write controller (RM_MMU 22d) writes the frame 64 in 32-bit wide double word format into contiguous buffer memory locations D0-DLAST following the corresponding memory location for the frame track field 66. Write controller 22d continues to write the 32-bit wide frame data fields in the contiguous locations D0, D1, etc. until the reception of an end of frame (RM_ENF) signal from the MAC 20. RM_MMU 22d then receives the status information from the MAC 20 and writes the status information into the status information field 70, i.e., STATUS Upper and STATUS Lower, followed by updating the frame track field 66. The write controller 22d then proceeds to write the next frame $64_2$, i.e, frame track field 66, data field 68 and status information field 70 in the next contiguous memory location, as shown in FIG. 3A.

The status information contained in STATUS Upper and STATUS Lower of the status information field 70 is used to provide receive status to the host CPU during slave transfers. The status information is also used by the descriptor management unit 24 to supply DMA receive status to the host CPU during DMA transfers.

Figure 3B:
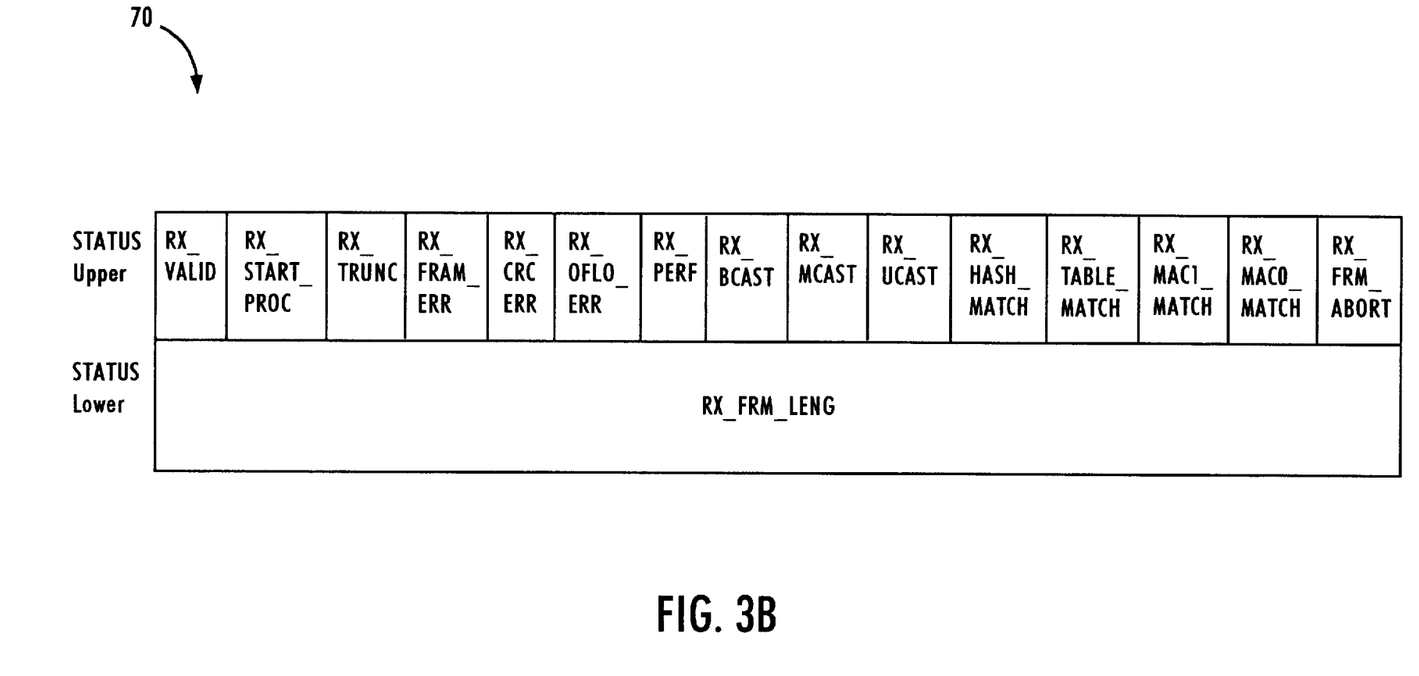

In the exemplary embodiment illustrated in FIG. 3B, STATUS Upper includes RX_VALID and RX_START_PROC fields. When RX_VALID=1, both STATUS upper and STATUS lower contain valid data. When RX_VALID=0, only the RX_START_PROC bit is valid. The RX_START_PROC (i.e., start processing) bit, when set to 1, indicates that processing of the beginning of the next frame in the RX_SRAM can begin.

STATUS Upper also contains an RX_TRUNC field which indicates that the controller truncated some data at the end of this receive frame and the truncated data is not written into system memory. Also included in STATUS Upper are several error fields, including RX_FRAM_ERR, which indicates that the receive frame 64 contains a non-integer multiple of eight bits and there is a cyclic redundancy check (CRC) error, RX_CRC_ERR, which indicates that the controller detected a CRC error, RX_OFLO_ERR, which indicates that the controller's internal receive buffer has overflowed.

STATUS Upper also contains RX_BCAST, RX_MCAST and RX_UCAST fields to indicate whether the frame is a broadcast frame, multicast frame or unicast frame, respectively. Also included in STATUS Upper are RX_PERF, RX_TABLE_MATCH, RX_MAC1_MATCH, RX_MAC0_MATCH and RX_HASH_MATCH to indicate various address matches for a frame with the addresses stored in a MAC address table or a MAC hash filter register. STATUS Upper further contains an RX_FRM_ABORT field which indicates that the controller determined this frame to be an invalid frame.

The STATUS Lower field contains an RX_FRM_LENG field which represents the total number of bytes of receive data in the respective frame. In alternative embodiments of the present invention, the data contained in frame track field 66 and status information field 70 may include other status information, depending on the particular design requirements.

RECEIVE BYTE OFFSET REGISTER

As described previously, the memory management unit 52 provides the logic for reading and writing frames to/from SRAMs 18a and 18b. In particular, RB_MMU 22c of MMI 52 operates as the read controller configured to transmit data from SRAM 18a via data path 62a to BIU 16 where the data is transmitted to a host CPU. In the present invention, a receive byte offset register is used that enables the host CPU to begin reading a data frame from the SRAM memory 18 starting from any particular byte, as well as change the starting byte.

In accordance with an embodiment of the present invention, when a DMA write or slave read access to RX_SRAM 18a is detected, RB_MMU 22c reads out the receive frame data from the RX_SRAM 18a and presents the frame data with the appropriate byte alignment to BIU 16 over data path 62a.

Figure 4:
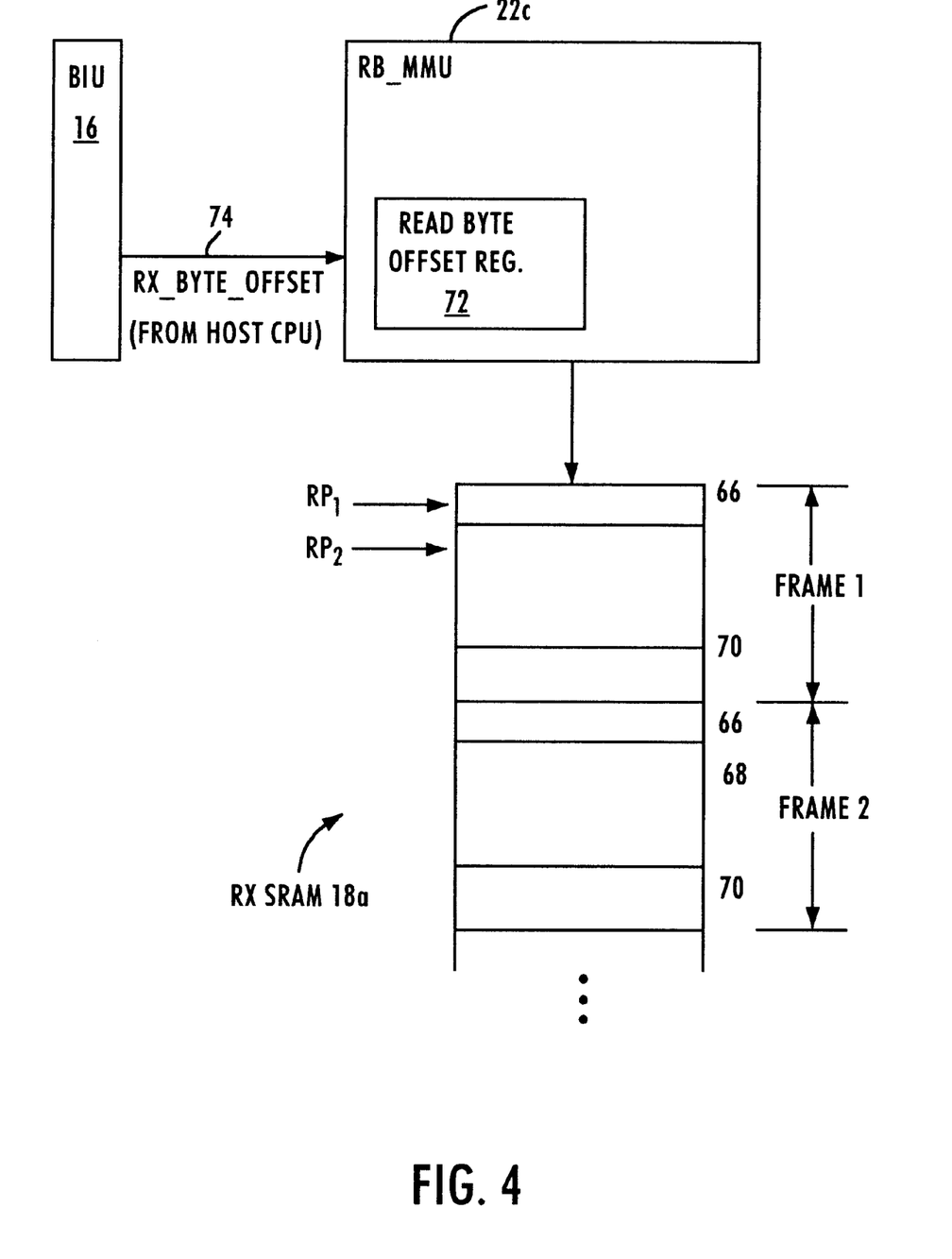
FIG. 4 is a block diagram illustrating the use of a read offset register in accordance with an embodiment of the present invention.

Referring to FIG. 4, when RB_MMU 22c detects a DMA write or slave read access, RB_MMU 22c first reads the contents of read byte offset register 72 to determine the value of the read controller's 22c internal read pointer. In the exemplary embodiment, the RB_MMU 22c reads data from the oldest received frame first, before frames received at a later time, and the internal read pointer of RB_MMU 22c points to the location in the oldest received frame stored in RX_SRAM 18a from where the reading of data is to begin.

For example, in an exemplary embodiment of the invention, upon initializing network interface device 10, the contents of the read byte offset register 72 will be set to "0". This value of "0" indicates the beginning of a frame 64. Accordingly, RM_MMN 22c begins reading data from RX_SRAM 18a from the first byte of the frame track field 66 in the oldest received frame stored in RX_SRAM 18a, as indicated by $RP_1$ in FIG. 4.

However, according to the present invention, the host CPU can program read byte offset register 72 to any value, so that the read controller 22c can begin reading data stored in RX_SRAM 18a starting from any particular byte in a frame 64.

The host CPU generates a RX_BYTE_OFST command that is transmitted to PCI BIU 16 and then transferred to RB_MMU 22c over data path 74. The RX_BYTE_OFST command is a binary number in units of bytes used to change the read controller's 22c internal receive buffer read pointer to point to a specific location within the oldest received frame. A value of "N" transmitted in RX_BYTE_OFST indicates skipping "N" initial bytes of a frame 64. In alternative embodiments where bit granularity is desired, the RX_BYTE_OFST command can be used to indicate the number of bits of a date frame to skip and the RM_MMU 22c will adjust the read pointer accordingly.

For example, suppose the host CPU wishes to skip the frame track information 66 and begin reading data starting at data field 68. In the exemplary embodiment illustrated in FIG. 3A, the frame track field 66 comprises four bytes. Accordingly, the host CPU sends the RX_BYTE_OFST command comprising a binary "4" value to RB MIJ 22c and controller 22c stores a value of "4" in receive byte offset register 72. Upon subsequent reads, RM_MMU 22c skips the first four bytes of frame 64 and begins reading data from the fifth byte of frame 64, as indicated by RP2 in FIG. 4, effectively bypassing the frame track field 66.

Subsequently, when a slave read access or a DMA write to RX_SRAM 18a is detected, the internal read pointer of RM_MMU 22c remains set to "4" and reading of data begins at the fifth byte of subsequent frames. However, the host CPU can change the contents of read byte offset register 72 at any time using the procedure discussed above, i.e., generate and transmit a new RX_BYTE_OFST command.

This use of a read byte offset register 72 in connection with RB_MMU 22c provides the present invention with improved flexibility in reading data frames, as opposed to the use of a conventional FIFO which requires the data to be read out in a first in, first out order. In the exemplary embodiment, read byte offset register 72 is shown internal to RB_MMU 22c. In alternative embodiments, read byte offset register may be located external to RB_MMU 22c.

Advantageously, using read byte offset register 72 in connection with RX_SRAM 18a enables the network interface device 10 and host CPU to process data in an efficient manner and save processing time by providing increased flexibility in reading data stored in RX_SRAM 18a.

For example, the host CPU can program the read byte offset register 72 to point to the header part of a receive frame 64 to determine the protocol of the frame 64, e.g., where in host memory 17 the frame will be sent. Next, the host CPU requests the particular protocol to allocate receive buffer(s) in that protocol's memory space. After the host CPU obtains the address to the protocol's memory space, the host CPU can reprogram RX_BYTE_OFST to any value.

Then, the host CPU can instruct the controller DMA or slave to transfer any remaining bytes of the frame 64 to the destination protocol space. Advantageously, determining the location in memory and allocating the appropriate memory space before the data is transferred saves processing time, thereby decreasing system latency.

Additionally, the host CPU may program the read byte offset register 72 to point to status information field 70 to determine if any type of frame error was detected, without having to read the entire frame track and data fields 66 and 68, respectively. Advantageously, the host CPU may determine that the data field 68 contains some type of data error, e.g., a CRC error, and may therefore wish to skip this data or send a signal to MAC 20 regarding the erroneous data. Advantageously, using the read byte offset register 72 in this manner also saves valuable CPU processing time associated with reading erroneous data.

According to the present invention, the host CPU can also change the contents of the read byte offset register 72 as the RM_MMU 22c is reading data as many times as it wishes. In this manner, the host CPU can re-read any part of a data frame, e.g., header information, depending on the particular requirements. This is beneficial in situations where the CPU for some reason was unable to receive the desired information. However, once the last data of the frame has been read, the read byte offset register 72 points to the read starting point for the subsequent frame.

Described has been an apparatus and method for accessing data transmitted over a network. An advantage of the invention is that stored data may be read in an efficient manner with increased flexibility. Another advantage of the invention is that the system can save processing time associated with transferring data received over a network, thereby decreasing system latency.

In this disclosure, there is shown and described only certain preferred embodiments of the invention, but, as aforementioned, it is to be understood that the invention is capable of use in various other combinations and environments and is capable of changes or modifications within the scope of the inventive concept as expressed herein.

What is claimed is:

1. A network interface device configured to transfer data received from a network to a host device and to receive data from the host device for transfer to the network, comprising:
    a random access memory;
    a programmable read offset register configured to store read pointer information received from the host device; and
    a read controller configured to read data stored in the random access memory based on the read pointer information, wherein
        the random access memory is configured to store a plurality of frames, each frame including packet data received over a network communications medium and status data related to the packet data, and
        the read controller is configured to skip a predetermined amount of data within an oldest received frame of the plurality of frames, based on the programmable read pointer information.

2. The network interface device of claim 1, wherein the read offset register is re-programmable by said host device.

3. The network interface device of claim 1, comprising:
    a host bus interface for transferring data from the random access memory to the host device.

4. The network interface device of claim 3, wherein the host bus interface includes a slave controller and a direct memory access controller.

5. In a network interface device configured to transfer data received from a network to a host device and to receive data from the host device for transfer to the network, a method of reading data comprising:

receiving data frames;

storing the data frames into a random access memory;

reading an offset value of a read offset register, the offset value of the read offset register being received from the host device; and     reading data stored in the random access memory based on the offset value of the read offset register, including skipping a first predetermined number of bytes of data within an oldest received frame stored in the random access memory based on the offset value of the read offset register.

6. The method of claim 5, comprising:

transferring data from the random access memory to the host device via a host bus interface.

7. The method of claim 5, comprising:

receiving, from the host device, another offset value;

storing the other offset value in the read offset register; and     reading data stored in the random access memory based on the other offset value.

8. A network interface device configured to transfer data received from a network to a host device and to receive data from the host device for transfer to the network, comprising:

a random access memory configured to store a plurality of data frames, wherein each frame includes packet data received over a network communications medium and status data related to the packet data;

a programmable register configured to store read pointer information based on information from the host device; and     a read controller configured to read data stored in the random access memory, wherein the read controller is configured to read data in the random access memory based on the read pointer information, including skipping a first predetermined number of bytes of data in an oldest received data frame of the plurality of data frames stored in the random access memory, based on the read pointer information.

9. The network interface device of claim 8, comprising:

a host bus interface for transferring data read from the random access memory to a host device.

10. The network interface device of claim 9, wherein the host bus interface includes a slave controller and a direct memory access controller.

\* \* \* \* \*